(12) United States Patent
Diamant

(10) Patent No.: US 6,874,147 B1
(45) Date of Patent: Mar. 29, 2005

(54) APPARATUS AND METHOD FOR NETWORKING DRIVER PROTOCOL ENHANCEMENT

(75) Inventor: Nimrod Diamant, Kfar-Saba (IL)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/443,026

(22) Filed: Nov. 18, 1999

(51) Int. Cl.[7] .................................................. G06F 9/46
(52) U.S. Cl. ..................... 719/328; 370/216; 709/220; 714/1
(58) Field of Search ................................. 370/216–317; 709/200–253; 710/300–317; 714/1–57; 719/328; 713/201

(56) References Cited

U.S. PATENT DOCUMENTS

| | | | |
|---|---|---|---|
| 6,131,163 A | 10/2000 | Wiegel | 713/201 |
| 6,253,334 B1 | 6/2001 | Amdahl et al. | 714/4 |
| 6,279,029 B1 | 8/2001 | Sampat et al. | 709/203 |
| 6,308,282 B1 * | 10/2001 | Huang et al. | 714/4 |
| 6,381,218 B1 | 4/2002 | McIntyre et al. | 370/245 |

OTHER PUBLICATIONS

Fu et al "The Design of a Low Cost Local Area Network Using Netware" Sep. 1997 pp. 40–43.

* cited by examiner

*Primary Examiner*—Meng-Al T. An
*Assistant Examiner*—Charles Anya
(74) *Attorney, Agent, or Firm*—Steven D. Yates

(57) ABSTRACT

Application Programming Interface, methods and apparatus are disclosed for enhancing data network communication. In a network including a first and a second network interface, each interface has an associated MAC address, and each network interface has a driver storing the MAC address for its associated interface. Under certain circumstances, such as in a fail-over condition, or to improve throughput, the second driver is conditionally directed to replace its stored MAC address with the MAC address of the first network interface. Thus, the second network interface can process network traffic as if it were the first network interface. Disclosed are several features and advantages resulting from such MAC reassignment.

16 Claims, 8 Drawing Sheets

FIG. 6A

```
              ┌─500
Function IdentifyYourself()
    Arguments:   Base Driver Identifier                           ┌─501
                 VendorID: Vendor ID value of Intermediate driver        ┌─502
                 CommRevision: Intermediate driver communication interface
                               revision number
    Actions:     Send control request to cause driver self-identification
    Returns:     CommRevision: driver communication interface revision number
                 VendorID: Vendor ID value of base driver
        503─     ResponseCode: Result code of any command to base driver.
        504─     CopyrightString: for verifying base driver authorization
        506─
        508─

┌─510
Function ReportNodeAddress()
    Arguments:   Base Driver Identifier
                 VendorID: Vendor ID value of Intermediate driver
                 CommRevision: Intermediate driver communication interface
                               revision number
    Actions:     Send control request to cause driver to report its MAC address.
    Returns:     MAC address ┌─512
Function UpdateNodeAddress()
    Arguments:   Base Driver Identifier
                 VendorID: Vendor ID value of Intermediate driver
              513─ CommRevision: Intermediate driver communication interface
                               revision number
                 MAC Address: New MAC address to be used by NIC.
    Actions:     Send control request to cause driver to replace stored MAC
    Returns:     Success/Failure ┌─514
Function ReportStatus()
    Arguments:   Base Driver Identifier
                 VendorID: Vendor ID value of Intermediate driver
                 CommRevision: Intermediate driver communication interface
                               revision number
    Actions:     Send control request to cause driver to report status
    Returns:     Link change
        516─     Line speed
        518─     Duplex
        520─     Hardware failure condition
        522─     PCI event
        524─
```

FIG. 6B

Function ReportCapabilities()
526 — Arguments: Base Driver Identifier
VendorID: Vendor ID value of Intermediate driver
CommRevision: Intermediate driver communication interface revision number
Actions: Send control request to cause driver to report capabilities
Returns: Array containing identifiers for supported protocols, e.g.,
528 — Out of Band
530 — Virtual LAN
532 — IP Encryption Function ReportVlanCapabilities()
534 — Arguments: Base Driver Identifier
VendorID: Vendor ID value of Intermediate driver
CommRevision: Intermediate driver communication interface revision number
Actions: Send control request to cause driver to report VLAN abilities
Returns: Array containing identifiers for supported VLAN protocols
536 — Operating Mode
538 — RX Filtering
540 —

Function VlanControl()
542 — Arguments: Base Driver Identifier
VendorID: Vendor ID value of Intermediate driver
CommRevision: Intermediate driver communication interface revision number
544 — VLAN mode
Actions: Send control request to cause driver to switch VLAN modes
Returns: Success/Failure Function SetControl()
546 — Arguments: Base Driver Identifier
VendorID: Vendor ID value of Intermediate driver
CommRevision: Intermediate driver communication interface revision number
548 — Mode
Actions: Send control request to cause driver to switch to Mode
Returns: Success/Failure Function Disconnect()
550 — Arguments: Base Driver Identifier
VendorID: Vendor ID value of Intermediate driver
CommRevision: Intermediate driver communication interface revision number
Actions: Send control request to notify driver of communication end
Returns: Command receipt acknowledgment

US 6,874,147 B1

APPARATUS AND METHOD FOR NETWORKING DRIVER PROTOCOL ENHANCEMENT

FIELD OF THE INVENTION

The invention generally relates to networking, and more particularly to runtime manipulation of networking drivers.

BACKGROUND

Since the advent of computers, various techniques have been used to allow computers to communicate. The common term for such communication is "networking" and many different models have been developed to describe the communication process. A well-known approach to representing networking communication is through use of the Open Systems Interconnection (OSI) Reference Model, which is a seven-layer model put forth by the International Standards Organization (ISO) in 1983.

The seven layers are the physical, data link, network, transport, session, presentation, and application layers; each layer represents a successive level of complexity and data-abstraction for an underlying raw data stream. That is, the physical layer (part of a network interface card (NIC)) is generally responsible for transmitting and receiving raw data (bits) from a network medium or interface. The physical layer does not maintain or require any particular structure to the data. The data link layer, however, abstracts the raw data stream into a series of frames, or chunks of raw data, allowing this layer to be generally responsible for ensuring that data is correct (e.g., all data received is correct). The network layer concerns properly routing data to and from appropriate sources and destinations. Each remaining layer is similarly responsible for providing further abstraction and integrity to a data stream. (For further information regarding the OSI model, see Computer Networks by Andrew Tanenbaum, Prentice Hall (2d. Ed. 1989).)

In order to distinguish one NIC from another, the NICs each have a unique identifier, commonly referred to as a Media Access Control (MAC) identifier. Communication protocols are bound to one or more NICs, allowing data utilizing the protocol to be routed over bound NICs. Commonly used protocols include connection-oriented protocols such as Transmission Control Protocol (TCP) and Sequenced Packet Exchange (SPX), as well as connection-less protocols such as Internet Protocol (IP), Internetwork Packet Exchange (IPX), and User Datagram Protocol (UDP).

Binding a NIC with a protocol is normally an operating-system boot-time event. For networking, after a machine performs its power-on self test (POST), and the operating system begins to load, control is passed to networking drivers which bind an instance of themselves to each NIC, and to one or more protocol stacks. The drivers also request its associated NIC to provide the NIC's MAC address. This address is stored in a memory reserved for the driver, and is also stored in the NIC's receive address filtering hardware. Once all NIC drivers have been initialized, data can be routed to and from each NIC.

Unfortunately, as will become clear in the following detailed description, once the Protocol stacks are bound to NICs using their drivers, there is no way to handle a NIC failure. If a particular NIC is used in a communication session between a source and a destination computer, and the NIC fails, current networking software does not allow silent replacement of the failed NIC with an operative NIC. Instead, a communication error occurs, preventing the application programs from being able to continue communication.

Some attempts have been made to overcome NIC failure issue. One solution is to overcome NIC failure by using standard functions to identify routing changes. If a NIC changes, a broadcast of a routing change is made to all clients, indicating that they need to switch to a new destination address (e.g., the replacement NIC). This solution, however, lacks transparency. Another alternate, as discussed in U.S. Pat. No. 5,661,719, is to provide NICs with programmable MAC addresses. This allows a new NIC to emulate the failed NIC, but it is a solution lacking flexibility.

SUMMARY

One aspect of the invention is an application programming interface (API) for enhancing data network communication. The API includes an identify address function including programming instructions for identifying a stored node address stored by a base driver for a network interface associated with the base driver. The API also includes an update node address function including programming instructions for directing the base driver to update the stored node address with a new node address in a configuration storage of the base driver, and in a receive address filtering table for the network interface.

BRIEF DESCRIPTION OF THE DRAWINGS

Features and advantages of the invention will become apparent to one skilled in the art to which the invention pertains from review of the following detailed description and claimed embodiments of the invention, in conjunction with the drawings in which:

FIG. 6 shows API function entries for implementing on-the-fly modifications to networking communication.

DETAILED DESCRIPTION

Figure 1:
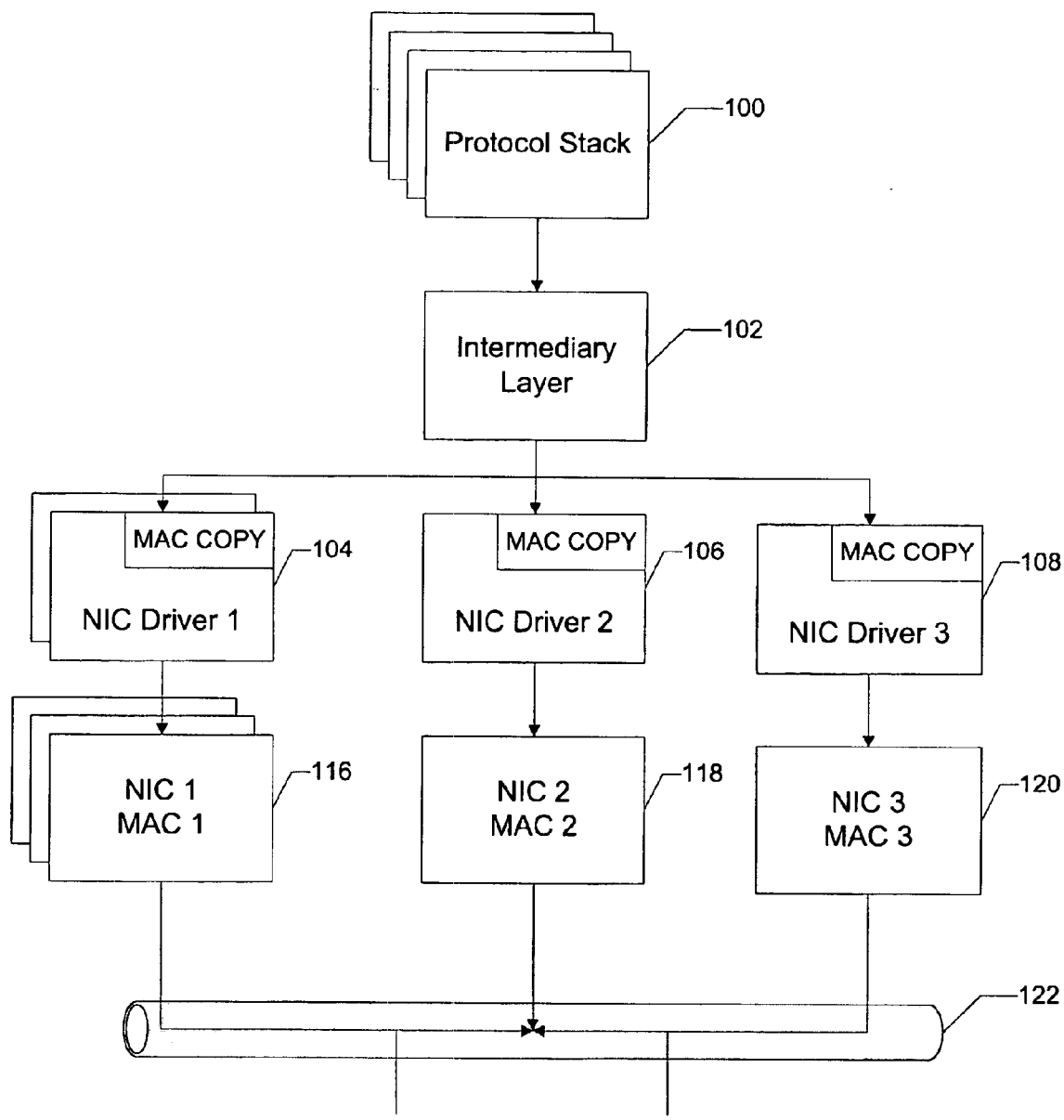
FIG. 1 illustrates a network communication configuration.

FIG. 1 illustrates a network communication configuration, in which a protocol stack 100 is in communication with an intermediary layer 102 (e.g., LSL or NDIS). There may be, as illustrated, several protocol stacks 100. It is assumed there is only a single protocol stack and a single intermediary layer. The protocol stack corresponds to typical networking protocols such as TCP, IP, SPX, IPX, NetBios, Netbeui, AppleTalk, X.400, and the like. The intermediary layer 102 is bound to the protocol stack, and helps route network traffic. The intermediary layer is in communication with multiple network interface card base drivers 104–108. As shown, instances of a single base driver 104 can be managing multiple network interfaces (three such interfaces are illustrated as a stack of interfaces 116). For presentation clarity, it is assumed each base driver communicates with a single network interface. Note that although network interface cards, or "NICs", are shown, the term NIC is meant to include input/output interfaces for alternate network configurations, such networks effected over serial/parallel port connections, Universal Serial Bus (USB) links, IEEE 1394 FireWire link, and the like.

In the illustrated configuration, the intermediary 102 appears to the stack 100 as a multiplexer to the different base drivers. The stack and base drivers are bound to the intermediary, resulting in network data received by the protocol stack being routed to the intermediary. The intermediary then becomes responsible for forwarding the network data on to an appropriate base driver 104–108 which is then responsible for transfer of the data to the NIC hardware 116–120 for delivery over a network connection 122.

On data reception over the network 122, all NICs see the data, but only the NIC hardware with the appropriate matching MAC filter responds to the incoming data. If a NIC accepts network data, it is forwarded to its driver, which in turn forwards it to the intermediary layer which multiplexes the data to an appropriate protocol stack.

The intermediary layer is capable of accepting many upper-layer protocol stacks, in addition to multiple drivers below it. Although not provided by present networking environments, this ability provides an opportunity for allowing transparent fail-over, load-balancing, and support for new network protocols and features, without changing existing base drivers 104–108 for current network interfaces 116–120.

In order to present a concrete example of how the intermediary layer 102 can be used to transparently extend the capabilities of existing network configurations, it will be assumed that a standard Novell Open Data-link Interface (ODI) based network is being extended. The ODI environment is a well known network configuration which does not provide for transparent logical replacement of a failed or failing NIC, nor support for features not natively supported by NIC networking software (e.g., the NIC drivers 104–108). It will be clear to one skilled in the art how to implement the invention in other network environments, e.g., Windows 9x/NT, Macintosh, Unix/Linux, etc., as each environment uses an intermediary layer.

Figure 2:
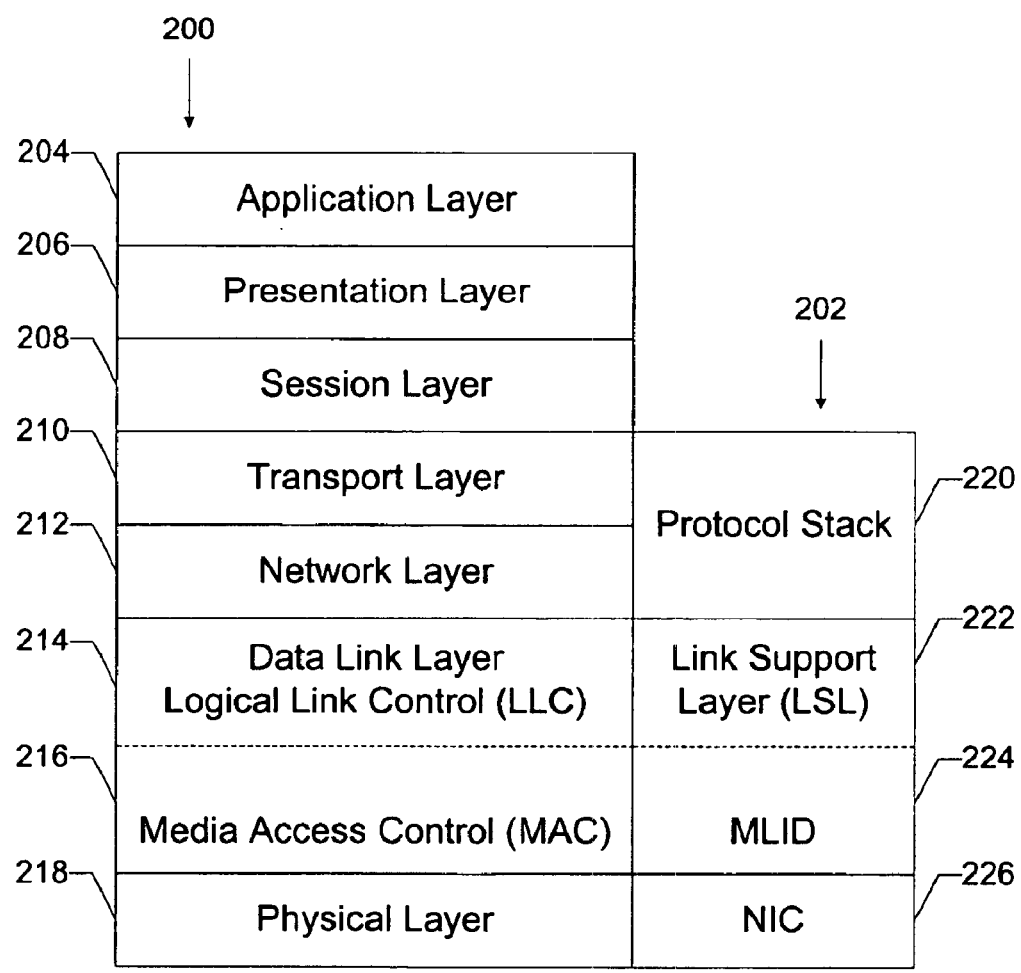
FIG. 2 shows the relationship between the traditional OSI model and Novell's ODI API.

FIG. 2 shows the relationship between the traditional OSI model 200 and Novell's ODI 202. The ODI is an application programming interface (API) developed by Novell for writing network drivers. As noted above, each supported NIC frame type is considered a different logical card, allowing the same NIC to carry data for different protocols (e.g., the same NIC can be simultaneously connected to both an IPX/SPX network as well as a TCP/IP network). As will be discussed, the ODI API can be extended to provide the claimed additional networking features.

Shown are the seven OSI layers 204–218, and the corresponding ODI layers 220–226 that are different from the OSI model. The protocol stack (PS) 220 represents each protocol implementation (e.g., SPX, AppleTalk, etc.) available within a computer.

The Multiple Link Interface Drivers (MLIDs) 224 are device drivers which send and receive packets to and from the physical layer (or logical topology) 218, 226. MLIDs have three portions, a Media Support Module (MSM), a Topology Specific Module (TSM), and a Hardware Specific Module (HSM). The HSM portion of MLIDs append or strip frame headers from data received over the physical layer, but they do not interpret packet data. Instead, received packets are passed on to the TSM and MSM for packet type classifying and then forwarded to Link Support Layer (LSL) 220 to be multiplexed to the appropriate protocol stack based on the contents of Event Control Blocks (ECBs).

ECBs are NetWare buffers that are used to send, receive and manage packet data. Generally an ECB contains information set by a protocol containing a block (e.g., 1500 bytes) of data. Such information includes the protocol originating the data, the NIC to which the data is to be sent, context information for the data, as well as other housekeeping information maintained by the protocol. The LSL effectively operates as a router, and coordinates communication between protocol stacks and MLIDs.

Traditionally, when data is transmitted, a protocol stack 220 receives data from an application program 204. The PS 220 determines whether to split the data into fragments, and also determines the size of the fragments. The PS adds a protocol header to the data, destination MAC address and logical board through which packet will be transmitted are placed in the ECB, and sends the data to the LSL 222. The LSL routes the data to an appropriate MLID 224. The MLID adds a MAC header to the data, and hands the data to the appropriate NIC (LAN adapter). Recall that the source MAC address added to the MAC header was read from the NIC during network initializabon; this value is retained by the MLID for later use. (It is too time consuming to query each NIC for its MAC address each time data needed is transmitted or received—hence this determination is supposed to be only performed once.) NIC 226 adds a packet preamble and places the data on the wire (alternatively, the medium may be wireless).

Receipt of transmitted data operates conversely. On data receipt, the NIC strips the packet preamble from received data. Only packets which meet the NIC's stored MAC address passes the NIC's receive filter. The MLID strips the MAC header from the data, places various fields in an ECB and forwards the data pointed by the ECB to the LSL. The LSL routes the packet to the appropriate PS, and the PS removes the protocol header and transfers the data to the application.

Unfortunately, as noted above, in a traditional communication model, transmission and receipt breaks down if the NIC fails. Failure can happen by hardware failure, disconnected cable, or other communication breakdown. That is, since the data stream is hard-wired to travel to a particular NIC, a failed NIC will cause communication to fail.

Figure 3:
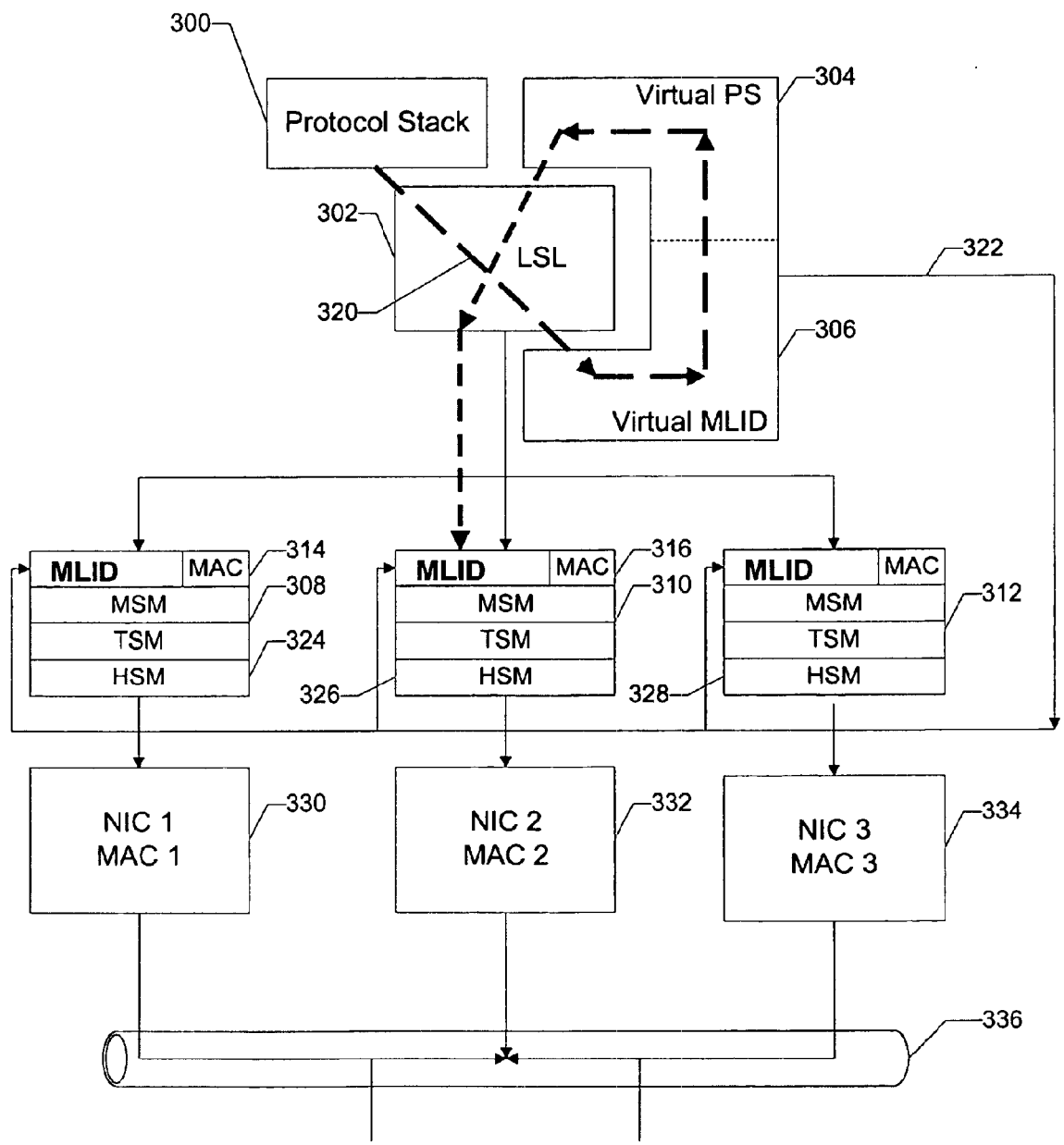
FIG. 3 illustrates one implementation of the FIG. 1 communication configuration in the FIG. 2 Novell networking context.

FIG. 3 illustrates one implementation of the FIG. 1 communication configuration in the FIG. 2 Novell networking context. Shown is a protocol stack 300 corresponding to the protocol stack(s) 100 of FIG. 1, an LSL multiplexer 302, and a virtual protocol stack (PS) 304 and virtual MLID 306. The protocol stack is a protocol typically provided by the operating system vendor (or is a compatible protocol provided by a third-party, such as an network interface vendor which supports the network interface).

In a traditional communication configuration, the LSL routes communication data to MLIDs 308–310 according to MLID identifiers (usually a logical board number) embedded within such communication which correspond to stored within the PS, the LSL and the MLID for corresponding. Instead, here, the protocol stack 300 is bound to the virtual MLID 306. Other protocols can be similarly bound. The virtual MLID appears to the LSL as a real adapter card's MLID driver. Consequently, network data 320 originating from the protocol stack 300 is routed by the LSL 302 to the virtual MLID 306 as normal. As discussed above with respect to FIG. 1, after this data is received at the virtual MLID, it may be repackaged as if originating from a different protocol stack 304.

This configuration allows the data 320 to be repackaged in a protocol format entirely different from the original protocol's format. Recall that the underlying philosophy to the OSI 200/ODI 202 models is that each higher layer provides extra functionality and/or features to a communication stream, such as data integrity checks, reliability checks, out-of-order packet re-ordering, etc. Thus, the virtual protocol may retransmit the data 320 in a specialized encryption format (e.g., IPsec), or in a virtual LAN format, or other format. (See also FIG. 5.)

Further, the repackaged data can be addressed so that it is directed towards any of the MLIDs 308–312, allowing dynamic alteration of which MLID will be used for communication. The virtual MLID maintains a correspondence between originating protocol stack 300 for a particular data stream 320, and the MLID 310 to which the data stream was delivered. When a transmit response is received by MLID 310, the LSL 302 routes the response back to the "originating PS", i.e., virtual PS 304. Internally, this response is stripped off any additional protocol features added to the outgoing data stream, and is presented back to the LSL 302 as if just received by the virtual MLID 306. The LSL then routes this response back to the real originating protocol stack 300, with the protocol stack 300 and LSL 302 being unaware of the data indirection.

One method for effecting the data repackaging is to copy and modify ECBs. In Novell networking, each transmitted data stream includes an Event Control Block (ECB) along with pointers to an ECB data payload (pointers within the ECB point to data buffers containing the payload). While redirecting the data 320, the ECB for this data is copied into a second ECB (per networking conventions, the first ECB should not be modified). The second ECB's payload pointers (e.g., FragmentOffset, FragmentSize) remain directed at the first ECB's payload data buffers. To track the copy, the second ECB is adjusted to back-reference the original ECB. This can be accomplished through an entry in the copied ECB's ProtocolWorkspace portion. This second ECB is also adjusted to direct the data towards a MLID of interest. Similar header copying and adjustment may be used for other networking environments (e.g., Linux/Unix, Macintosh, Microsoft Windows 9x/NT, etc.). By creating copies of the ECBs, one can control the format and destination of data originally received from the protocol stack 300.

Shown is a control line 322 (e.g., data pathway) in communication with each MLID 308–312. The control line 322 can be implemented using the Driver Management Input/Output Control (IOCTL) method defined in ODI Lan Driver specification, where a formatted management ECB is sent to a base driver. A command/query communication data structure can be defined using a standard NetWare ECB buffer used in the Novell driver management API. This command/query ECB will be filled with appropriate command and related parameters, and then be handed to an MLID base driver by calling the Ctl14_DriverManagement API. The base driver will act according to the command field in this buffer and fill a response result and parameters in the same buffer. In particular, an MLID can be directed to replace its stored MAC address with a different value, thus replacing the value obtained when initializing the networking hardware 330–334 and software (usually occurring at base driver load time). The MLID stores the new MAC address in the NIC's address filtering hardware as well as in the MLID's configuration table. Another care is taken to update the TSM's source MAC address field it adds to every transmitted packet, with the new updated MAC address.

Once a MLID can be instructed to revise its stored MAC address, multiple NICs can be installed in a machine, but where only one NIC 332 is actively communicating through its MLID 310, and the others 308/330, 312/334 are left "disabled" for fail-over purposes. In one embodiment, an Adapter Fault Tolerance (AFT) mode is provided, where a fail over NIC waits for failure of an active NIC. (See also FIG. 4.) If the active NIC 332 suffers a hardware failure or its link is off, a fail over NIC 330 can be brought on line by having its associated MLID 308 revise its stored MAC address 314 with the MAC address 316 from the failed NIC.

Similarly, in one embodiment, load balancing may be effected by directing plural MLIDs 308–312 to store an identical MAC address. The virtual PS 304 can then monitor data traffic flow to identify a least-busy NIC and direct the LSL 302 to route data 320 to that NIC. (The LSL does not route data to MLIDs based on the stored MAC address.) In this embodiment, an Adaptive Load Balancing (ALB) mode, and Link Aggregation mode is provided, where all NICs are active, until one fails, causing the failed NIC to be removed from load balancing until it is repaired.

Each NIC 330–334, unaware of the MAC address stored in its associated MLID driver, receives the data stamped in the source address field by its MLID with the stored MAC address and submits it to the wire 336 for delivery.

Upon receipt of end of transmit response, the NIC presents the response to its MLID. The MLID passes the response to the LSL which routes it back to the virtual PS 304. Recall that the virtual PS 304 and MLID 306 have maintained a concordance between data received from an originating protocol stack 300 and the MLID to which the data was ultimately forwarded. Based on this, the data can be returned to the originating protocol stack 300.

Figure 4:
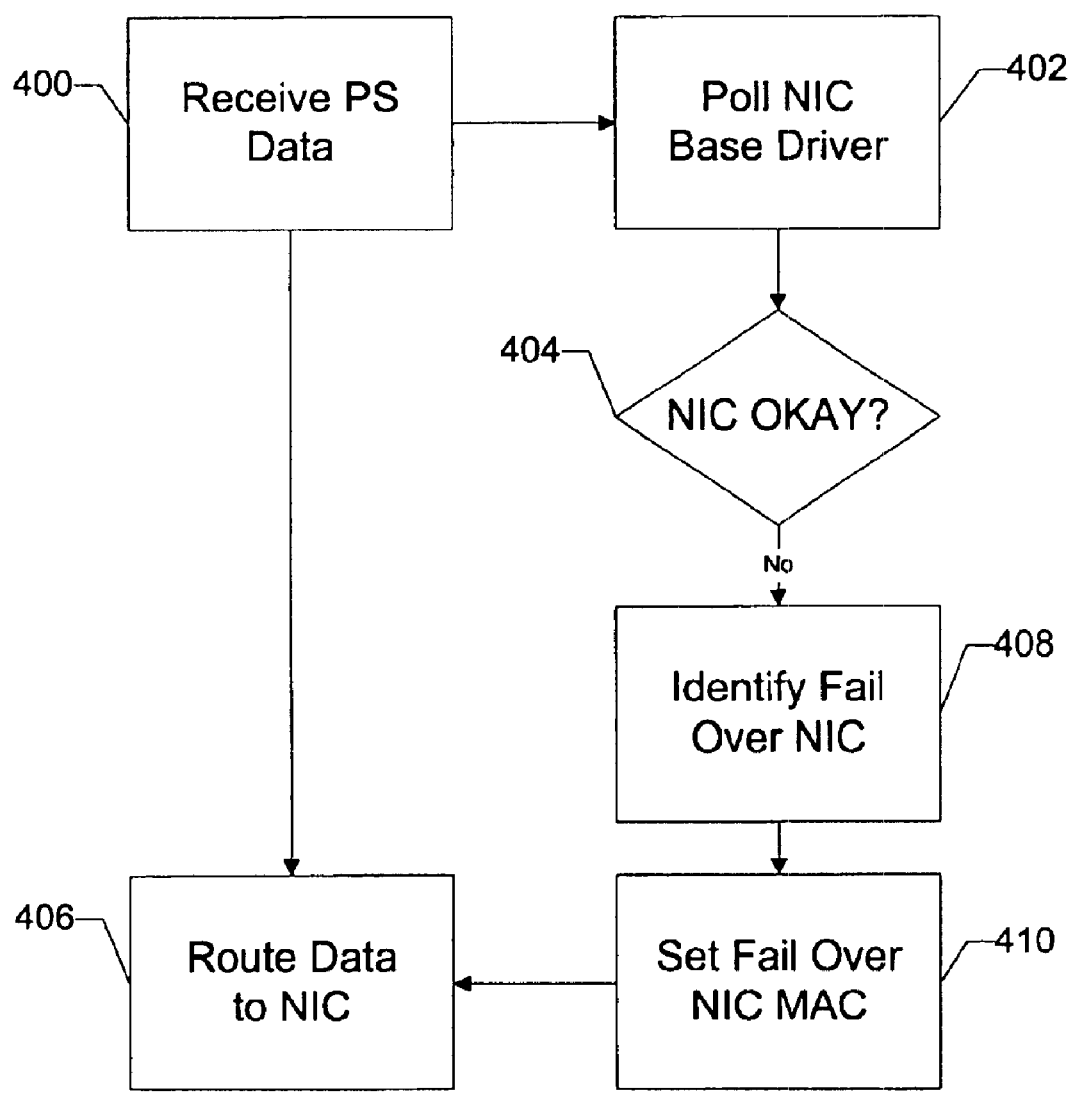
FIG. 4 is a general flowchart for transparent fail-over for a defective NIC.

FIG. 4 is a general flowchart for transparent fail-over for a defective NIC, such that networking software never becomes aware of the failure. When network data is received 400, a test is performed to determine the status of the NIC. In one embodiment, this test is performed by polling 402 the base driver which in turn tests the network hardware if necessary. This polling and possible fail over may also occur asynchronously with network communication. As discussed above, in the Novell networking context, routing is performed by the LSL according to the contents of repackaged originating protocol stack data. A test 404 is performed to identify whether polling revealed a defective NIC. If a "primary" NIC fails the test, meaning that the NIC has or is in the process of failing, a fail over "secondary" NIC is identified 408. As discussed above, one can have several secondary NICs installed within a computing device, but left idle until needed for fail over duty. One method for implementing such an idle state is to use the Novell Driver Management API to direct the MLIDs for the secondary NICs to enter into an inactive state. Then, when a primary NIC has failed, one of the secondary NICs can be selected and the corresponding MLID directed to load the MAC value for the failed NIC. The data from the originating protocol stack can then be directed to the fail over NIC until such time as the primary NIC is replaced or repaired.

The identified 408 secondary NIC is set 410 to utilize the MAC for the failed primary NIC. When asynchronously polling NICs, replacement of the failed NIC occurs before a sender of data receives a time out or other communication error from attempting communication through the failed NIC. In an alternate embodiment, NIC testing is performed along with data transmission, such that the base driver is polled 402 and evaluated 404 before data transferred 406 to a NIC.

Figure 5:
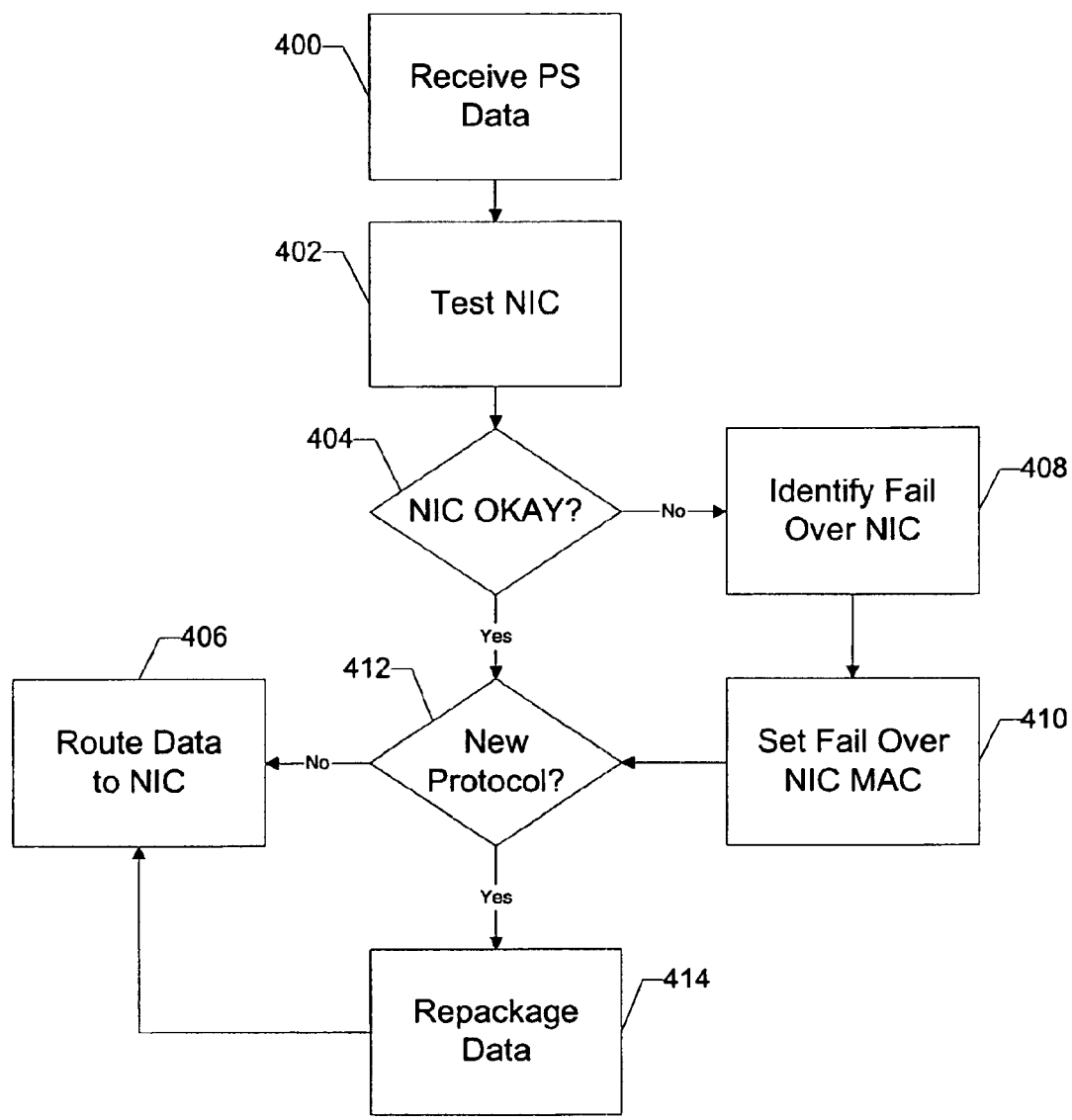
FIG. 5 is a general flowchart for transparently repackaging an original data stream in a new protocol format.

FIG. 5 is a general flowchart for transparently reformatting an original data stream from a protocol stack in a protocol format or networking feature not supported by the OS's protocol stack software. This figure shares items 400–410 of FIG. 4. This figure differs in that if 404 the NIC test yields okay, a subsequent test 412 is made to determine whether a new protocol or networking feature is to be used. For example, the NIC may be connected to a network requiring encrypted IP communication. If so, then the data can be repackaged 414 in an appropriate protocol and routed 406 to the NIC for distribution over a network.

Note that in an alternate embodiment, testing 402 a NIC, identifying 404 its health, and selecting a fail over NIC 408, 410 can be performed asynchronously (e.g., in parallel) to regular network traffic processing. In this alternate embodiment, data is received 400 and processing continues directly with checking 412 whether a new protocol or feature is being used. A database, run-time variable, or other memory is used to store a MAC (or other identifier) address for a current primary adapter (e.g., the NIC presently in-use) to be used for network transfers. In parallel to processing received data, a separate process performs the testing 402, 404 and fail-over selection 408, 410 of a replacement NIC.

FIG. 6 show API function entries for implementing the above described on-the-fly modifications to networking communication. The API defines the control, management and advanced data interface between the invention, which includes a virtual protocol stack and virtual MLID as discussed above, and the MLID Base Driver in Novell's NetWare ODI networking environment. The API provides an interface for controlling and querying the base driver, as well as for transfer of data to and from a base driver, and encapsulation of data in data formats (e.g., new protocols and new networking features) not currently supported by the standard Novell interface. As discussed above, underlying the API is the control channel (FIG. 3, item 322), which among other actions, may be used to change a NIC's MAC address (Node Address) on the fly.

In an API configuration, the control interface 322 is based on a master slave protocol, where the virtual PS 304 and MLID 306 are the master, and the base drivers 308–312 are the slave. The slave drivers are polled at a predetermined polling period, e.g., 100 to 400 milliseconds or other period depending on data response requirements. As an alternative to polling, one can generate events from a base driver through the Novell Event Bus (NEB), with the virtual PS and MLID registered to receive events. However, for simplicity in presentation, it has been assumed that polling is utilized, and that the MLID base drivers respond to control messages immediately.

Starting on FIG. 6A, a first API command is IdentifyYourself 500. This command requests a base driver (a MLID in a Novell networking context) to identify itself. This should be the first command sent to a base driver to allow verification that the base driver knows the virtual PS communication protocol. Passed as calling parameters to each API call are a VendorID 501, and CommRevision 502. The VendorID identifies the requestor to the base driver receiving the command, and allows the base driver to perform validation of the request. The CommRevision identifies the revision number of the API used to query the base driver, and allows the driver to ensure it responds appropriately to the API (e.g., different API versions may have different data expectations).

In response to the identity check, the base driver should return the following fields: CommRevision 503, which indicates the driver's communication interface revision number; VendorID 504, which indicates a vendor ID value of base driver; ResponseCode 506, which embodies a response, if any, to commands sent to the base driver; and CopyrightString 508, a protected statement returned by a driver to indicate that the driver is authorized to be communicating with the virtual PS. For example, to ensure that only licensed vendors are using the virtual PS to repackage network communication in a new (e.g., previously unsupported) format, the driver can be required to return a copyrighted string before the virtual PS will communicate with that driver. Since the string is protected under copyright (and other applicable regulations), to be compatible with the virtual PS environment, one would have to seek proper authorization, or illicitly use the string. In this latter context, such illicit use may subject one to significant liability.

Another API command is ReportNodeAddress 510. This command is used to identify a base drivers stored MAC address. As discussed above, this value can be determined by returned value from the driver. Or, alternatively, the address can be determined by inspecting the configuration table of the driver.

Another API command is UpdateNodeAddress 512. This command is used to tell a driver to override its MAC address with a new MAC address 513 passed as a calling parameter. As discussed above, this command can be used at fail over time for fault tolerance, or when load balancing (e.g., link aggregation mode for aggregated bandwidth) where all underlying NICs use the same MAC address. As a result of this command, a base driver should update its MAC address in its configuration table, MSM (under Novell) shared data space, and in its hardware receive filtering table. If the driver (or its NIC) is not ECB aware, then the new address should be written on every packet the base driver delivers to the NIC (e.g., in the DriverSend routine). Writing the new address overcomes a limitation in the ODI specification and the way MSM and EtherTSM are implemented.

Note that fail over can be used to allow uninterrupted network communication during hot plug removal of a NIC, such as in a PCI environment. When a card is removed, the base driver will report (in response to the ReportStatus request) the removed card. If card was the primary adapter (e.g., in use), network communication will fail over to a secondary adapter with the secondary NIC getting the MAC address of the primary adapter. If it is desirable to maintain separate MAC addresses when the removed card is returned, the primary and secondary cards can be instructed to swap MAC addresses. The driver representing the card in hot plug event will be called to update its MAC address even though the NIC is not present. When the card is reinserted, the driver should use the swapped address. This function can also be used in fail over conditions during Adaptive Load Balancing (ALB) (ALB balances outgoing server traffic among multiple NICs, providing scalable bandwidth as well as automatic backup links through fault tolerance).

Another API command is ReportStatus 514. This command is used to ask a base driver to report its running status. In response, a base driver can report operating conditions such as link change 516, line speed 518, duplex 520, hardware failure condition 522, hot plug PCI event (card removal) 524 or other results as desired. As discussed above, status will be polled at a predetermined interval (e.g., 100–400 400 msec) according to required response times.

Continuing on to FIG. 6B, another API command is ReportCapabilibes 526. This command is used to ask a base driver to report supported capabilities. Such capabilities can include support for ECB out of band information 528, e.g., the use of an ECB to pass advanced data features on a per packet basis to and from a base driver, virtual LAN 530, IP encryption 532, etc. Note that some results, such as indicating virtual LAN capability 530, necessarily imply other results, such as support for the out of band information 528.

Another API command is ReportVlanCapabilities 534. If virtual LAN support is present, this command can be used to ask a base driver to report what VLAN standards 536 it supports, whether VLAN mode can be enabled or disabled 538, and whether the base driver supports VLAN RX filtering 540 (this support, if performed in hardware, will offload from a system's PCI bus any VLAN traffic not destined for the system).

Another API command is VLanControl 542. This command is used to ask a base driver to change VLAN modes 544, if changing modes is supported (depends on the supported standards 536), or to set the VLAN filtering mode (if supported).

Another API command is SetControl 546. This command is used to ask a base driver to revise basic functionality. This is an opened function and depends on functionality required of the base driver and/or NIC. This command can be used, for example, to enable or disable ECB out of band mode 548. (At unbind time, original driver settings will be restored.)

Another API command is BD_Disconnect 550. This command notifies a base driver that this new advanced contol communication with the driver has been terminated. This provides opportunity for the driver to recover, if necessary, or make adjustments due to the termination of communication.

Figure 7:
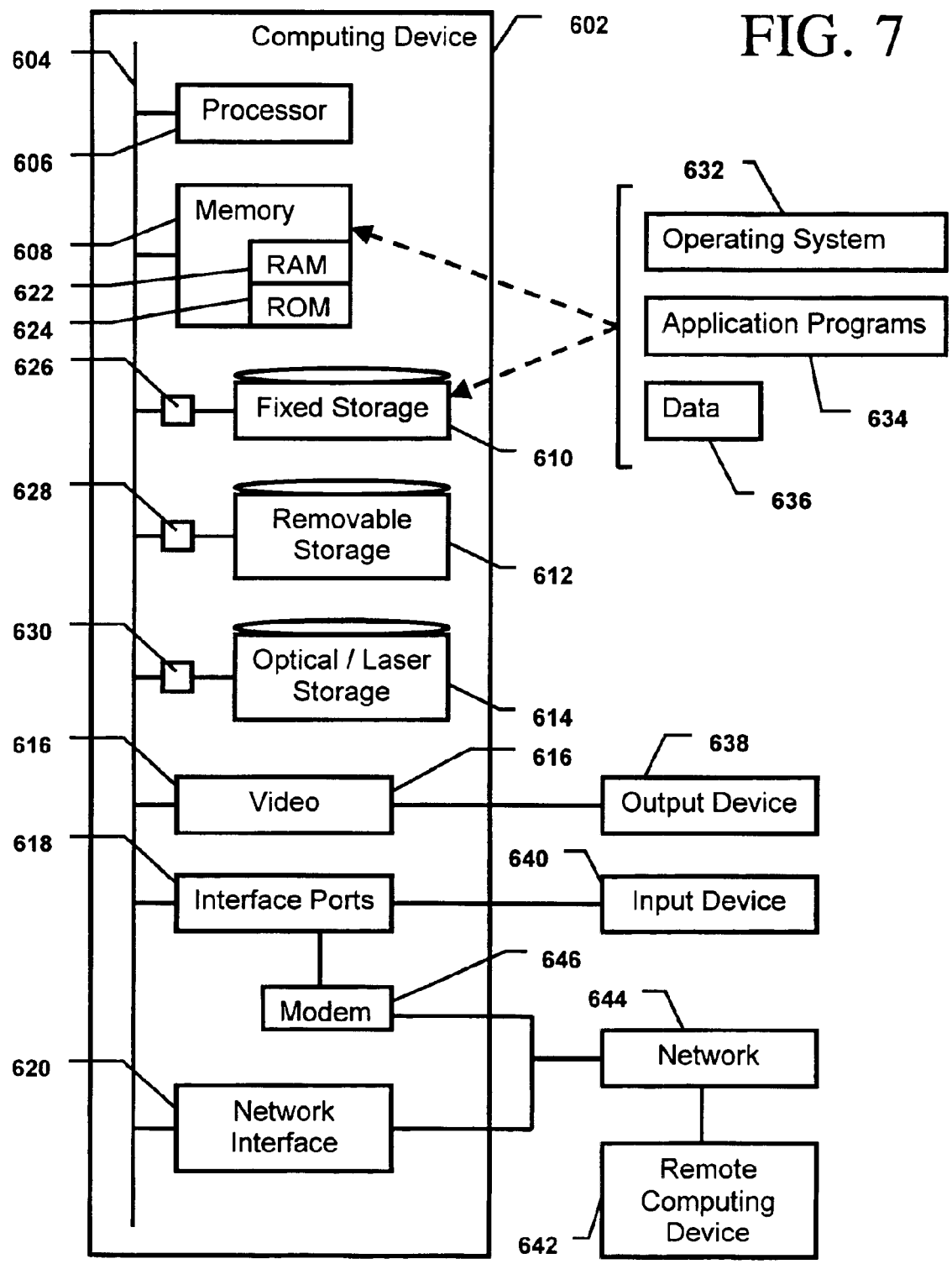
FIG. 7 illustrates a suitable computing environment in which the claimed invention may be practiced.

FIG. 7 and the following discussion are intended to provide a brief, general description of a suitable computing environment in which the claimed invention may be practiced. The invention may be described by reference to different high-level program modules and/or low-level hardware contexts. Those skilled in the art will realize that program module references can be interchanged with low-level hardware instructions.

Program modules include procedures, functions, programs, components, data structures, and the like, that perform particular tasks or implement particular abstract data types. The modules may be incorporated into single and multi-processor computing systems, as well as hand-held devices and controllable consumer devices. It is understood that modules may be implemented on a single computing device, or processed over a distributed network environment, where modules can be located in both local and remote memory storage devices.

An exemplary system for implementing the invention includes a computing device 602 having system bus 604 for coupling together various components within the computing device. The system bus 604 may be any of several types of bus structure including a memory bus or memory controller, a peripheral bus, and a local bus using any of a variety of conventional bus architectures such as PCI, AGP, VESA, Microchannel, ISA and EISA, to name a few. Note that only a single bus is illustrated, although plural buses typically achieve performance benefits. Typically, attached to the bus 602 are at least one processor 606, memory 608, storage device (e.g., fixed 610, removable 612, optical/laser 614), video interface 616, input/output interface port 618, and network interface 620.

The processor 606 may be any of various commercially available processors, including Intel processors, or the DEC Alpha, PowerPC, programmable gate arrays, signal processors, or the like. Dual, quad processors, and other multi-processor architectures also can be used. The system memory includes random access memory (RAM) 622, and static or re-programmable read only memory (ROM) 624. A basic input/output system (BIOS), stored in ROM, flash ROM, cached to RAM or the like, contains routines for information transfer between device 602 components or device initialization.

The fixed storage 610 generally refers to hard drive and other semi-permanently attached media, whereas removable storage 612 generally refers to a device-bay into which removable media such as a floppy diskette is removably inserted. The optical/laser storage 614 include devices based on CD-ROM, DVD, or CD-RW technology, and are usually coupled to the system bus 604 through a device interface 626, 628, 630. The storage systems and associated computer-readable media provide storage of data and executable instructions for the computing device 602. Note that other storage options include magnetic cassettes, tapes, flash memory cards, memory sticks, digital video disks, and the like.

The exemplary computing device 602 can store and execute a number of program modules within the RAM 622, ROM 624, and storage devices 610, 612, 614. Typical program modules include an operating system 632, application programs 634 (e.g., a web browser or network application program), etc., and application data 636. Program module or other system output can be processed by the video system 616 (e.g., a 2D and/or 3D graphics rendering device), which is coupled to the system bus 604 and an output device 638. Typical output devices include monitors, flat-panels displays, liquid-crystal displays, and recording devices such as video-cassette recorders.

A user of the computing device 602 is typically a person interacting with the computing device through manipulation of an input device 640. Common input devices include a keyboard, mouse, tablet, touch-sensitive surface, digital pen, joystick, microphone, game pad, satellite dish, etc. One can also provide input through manipulation of a virtual reality environment, or through processing the output from a data file or another computing device.

The computing device 602 is expected to operate in a networked environment using logical connections to one or more remote computing devices. One such remote computing device 642 may be a web server or other program module utilizing a network application protocol (e.g., HTTP, File Transfer Protocol (FTP), Gopher, Wide Area Information Server (WAIS)), a router, a peer device or other common network node, and typically includes many or all of the elements discussed for the computing device 602. To provide NIC fail over, the computing device 602 has plural network interfaces 620 (e.g., an Ethernet card) as described above, having updateable MAC address. These interfaces 620 are coupled to the system bus 604, allowing communication with the remote device 642. Both the local computing device 602 and the remote computing device 642 can be communicatively coupled to a network 644 such as a WAN, LAN, Gateway, Internet, or other public or private data-pathway. It will be appreciated that other communication links between the computing devices, such as through a modem 646 coupled to an interface port 618, may also be used.

In accordance with the practices of persons skilled in the art of computer hardware and software programming, the present invention is described with reference to acts and symbolic representations of operations that are sometimes referred to as being computer-executed. It will be appreciated that the acts and symbolically represented operations include the manipulation by the processor 606 of electrical signals representing data bits which causes a resulting transformation or reduction of the electrical signal representation, and the maintenance of data bits at memory locations in the memory 608 and storage systems 610, 612, 614, so as to reconfigure or otherwise alter the computer system's operation and/or processing of signals. The memory locations where data bits are maintained are physical locations having particular electrical, magnetic, or optical properties corresponding to the data bits.

Having described and illustrated the principles of the invention with reference to illustrated embodiments, it will be recognized that the illustrated embodiments can be modified in arrangement and detail without departing from such principles. For example, while the foregoing description focused—for expository convenience—on the Novell networking/ODI API environment, it will be recognized that the same techniques and analyses can be applied to different networking configurations, such as certain Macintosh, Microsoft (NTx Win9x and the like) and Unix environments. In addition, even though description or claim language may speak to only one or two network interfaces, it will be appreciated that the invention is applicable to devices simultaneously utilizing many network interfaces.

And, even though the foregoing discussion has focused on particular embodiments, it is understood that other configurations are contemplated. In particular, even though the expressions "in one embodiment" or "in another embodiment" are used herein, these phrases are meant to generally reference embodiment possibilities, and are not intended to limit the invention to those particular embodiment configurations. These terms may reference the same or different embodiments, and unless indicated otherwise, are combinable into aggregate embodiments.

Consequently, in view of the wide variety of possible networking environments, the detailed embodiments are intended to be illustrative only, and should not be taken as limiting the scope of the invention. Rather, what is claimed as the invention, is all such modifications as may come within the scope and spirit of the following claims and equivalents thereto.

What is claimed is:

1. A computer accessible medium having associated therewith encoded instructions to direct a processor to perform an application programming interface (API) having:
   an identify address function for identifying a stored node address stored by a based driver;
   a status function in communication with a first base driver for a first network interface to detect a failure of the first network interface;
   a failover function including an update node address function to direct a second base driver for a second network interface to store the node address of the first network interface in a configuration storage as the stored node address for the second base driver, and to store the node address of the first network interface in a receive address filtering table stored in the second network interface, when it is determined that the first network interface is not operational; and
   a first transmission function for re-transmitting network data, received in a compatible format from a network source, in an incompatible format to a network destination, and a second transmission function for re-transmitting network data, received in the incompatible format from the network destination, in the compatible format to the network source when it is determined that a new protocol is needed.

2. The API of claim 1, wherein the identify address function includes submitting a request to the base driver, to which is received a response including the node address stored by the base driver.

3. The API of claim 1, wherein the identify address function includes programming instructions for inspecting the configuration storage of the base driver, such storage having an entry identifying the stored node address.

4. The API according to claim 1, further comprising:
   a driver identification function including programming instructions for sending an identity-check request to the base driver, said base driver providing a response selected from a group consisting of: a predetermined identifier, a base driver revision number, and an identification of a vendor of the base driver.

5. The API according to claim 4, wherein the predetermined identifier is a copyright string for the vendor of the base driver.

6. An article of manufacture, comprising a computer accessible medium having associated therewith programming instructions capable of directing a processor to perform operation of:
   an identify address function for identifying a stored node address stored by a based driver;
   a status function in communication with a first base driver for a first network interface to detect a failure of the first network interface;
   a failover function including an update node address function to direct a second base driver for a second network interface to store the node address of the first network interface in a configuration storage as the stored node address for the second base driver, and to store the node address of the first network interface in a receive address filtering table stored in the second network interface, when it is determined that the first network interface is not operational; and
   a first transmission function for re-transmitting network data, received in a compatible format from a network source, in an incompatible format to a network destination, and a second transmission function for re-transmitting network data, received in the incompatible format from the network destination, in the compatible format to the network source when it is determined that a new protocol is needed.

7. The API according to claim 1, further comprising:
   a report capabilities function including programming instructions for sending the base driver a request to have the base driver report its capabilities;
   a receive capabilities function including programming instructions for receiving a response including said capabilities;
   wherein the incompatible format is formatted according to said capabilities.

8. The API according to claim 1, further comprising:
   a virtual LAN function including programming instructions to direct the base driver to enter a desired virtual LAN operative state; and
   a disconnect function including programming instructions to notify the base driver that the API has concluded communications with the base driver.

9. The API according to claim 1, in which a Novell ODI compliant network is utilized for network communication, and wherein the update node address function uses at least one ODI MLID Control Routine.

10. The API according to claim 1 for providing transparent load balancing of data transmissions directed towards the first network interface by distributing such data across the second network interface, further comprising:
   a queue monitoring function including programming instructions for detecting a workload of the first network interface; and
   a distribution function including programming instructions for routing a portion of said data transmissions through the second network interface, said distribution function utilizing the update node address function to associate a node identifier of the first network interface with the second network interface.

11. A networking method for operational network interfaces, comprising:
   receiving network traffic for a first network interface having a first node address at a protocol stack;
   determining the operative status of the first network interface having a first driver;
   if the first network interface is inoperative, instructing a second driver of a second network interface, by an application programming interface (API) including an update function to store a MAC address of the first network interface in a configuration storage of the second driver and to store the MAC address in a receive address filtering table of the second network interface;
   directing the second driver to activate the second network interface;
   directing the first driver to deactivate the first network interface;
   determining if a new protocol stack is needed for routing the network traffic;
   if a new protocol stack is needed, sending the traffic to an intermediary layer;
   routing the network traffic from the intermediary layer to a virtual driver;
   repackaging the network traffic by the virtual driver, providing the repackaged network traffic to a virtual protocol stack;
   sending the repackaged network traffic from the virtual protocol stack back to the intermediary layer; and
   routing the repackaged network traffic by the intermediary layer to the second driver of the second network interface.

12. The networking method of claim 11, wherein before instructing a second driver of a second network interface, by the application programming interface (API) including an update function to store the MAC address of the first network interface in a configuration storage of the second driver and to store the MAC address of the first network interface in a receive address filtering table of the second network interface comprises:
   submitting a node identification request to the second driver for a potential fail over network interface; and
   receiving a response from the second driver, said response including an authentication string;
   verifying said authentication string has a predetermined value before said potential fail over network interface is used as the fail over network interface.

13. An article of manufacture, comprising a computer accessible medium having associated therewith encoded programming instructions capable of to directing a processor to perform operation of:
   receiving network traffic for a first network interface having a first node address at a protocol stack;
   determining the operative status of the first network interface having a first driver;
   if the first network interface is inoperative, instructing a second driver of a second network interface, by an application programming interface (API) including an update function to store a MAC address of the first network interface in a configuration storage of the second driver and to store the MAC address of the first network interface in a receive address filtering table of the second network interface;
   directing the second driver to activate the second network interface;
   directing the first driver to deactivate the first network interface;
   determining if a new protocol stack is needed for routing the network traffic;
   if a new protocol stack is needed, sending the traffic to an intermediary layer;
   routing the network traffic from the intermediary layer to a virtual driver;
   repackaging the network traffic by the virtual driver, and providing the repackaged network traffic to a virtual protocol stack;
   sending the repackaged network traffic from the virtual protocol stack back to the intermediary layer; and
   routing the repackaged network traffic by the intermediary layer to the second driver of the second network interface.

14. A method of redundant networking in a networking environment, comprising:
   receiving network traffic for a first network interface having a first node address at a protocol stack;
   determining the operative status of the first network interface having a first driver;
   if the first network interface is inoperative, instructing a second driver of a second network interface, by an application programming interface (API) including an update function to store a MAC address of the first network interface in a configuration storage of the second driver and to store the MAC address of the first network interface in a receive address filtering table of the second network interface;
   directing the second driver to activate the second network interface;
   directing the first driver to deactivate the first network interface;
   determining if a new protocol stack is needed for routing the network traffic;
   if a new protocol stack is needed, sending the traffic to a intermediary layer;
   routing the network traffic from the intermediary layer to a virtual driver,
   repackaging the network traffic by the virtual driver, and providing the repackaged network traffic to a virtual protocol stack;
   sending the repackaged network traffic from the virtual protocol stack back to the intermediary layer; and
   routing the repackaged network traffic by the intermediary layer to the second driver of the second network interface.

15. A method according to claim 14, in which the network environment is a Novell based network, and wherein ODI commands are issued to said first and second drivers.

16. A method of enhancing data network communication comprising:

receiving network traffic for a first network interface having a first node address at a protocol stack;

determining the operative status of the first network interface having a first driver;

if the first network interface is inoperative, instructing a second driver of a second network interface, by an application programming interface (API) including an update function to store a MAC address of the first network interface in a configuration storage of the second driver and to store the MAC address of the first network interface in a receive address filtering table of the second network interface;

directing the second driver to activate the second network interface;

directing the first driver to deactivate the first network interface;

determining if a new protocol stack is needed for routing the network traffic;

if a new protocol stack is needed, sending the traffic to a intermediary layer;

routing the network traffic from the intermediary layer to a virtual driver;

repackaging the network traffic by the virtual driver, and providing the repackaged network traffic to a virtual protocol stack;

sending the repackaged network traffic from the virtual protocol stack back to the intermediary layer; and routing the repackaged network traffic by the intermediary layer to the second driver of the second network interface.

* * * * *

UNITED STATES PATENT AND TRADEMARK OFFICE
CERTIFICATE OF CORRECTION

PATENT NO. : 6,874,147 B1
DATED : March 29, 2005
INVENTOR(S) : Diamant

It is certified that error appears in the above-identified patent and that said Letters Patent is hereby corrected as shown below:

Column 4,
Line 25, "initializabon" and insert -- initialization --.

Signed and Sealed this

Thirty-first Day of May, 2005

JON W. DUDAS
*Director of the United States Patent and Trademark Office*